//<br>

United States Patent [19]

Jurenz et al.

[11] 4,165,167

[45] Aug. 21, 1979

[54] PHOTOGRAPHIC CAMERA

[75] Inventors: Rolf Jurenz; Claus Becker, both of Dresden, Fed. Rep. of Germany

[73] Assignee: Veb Pentacon Dresden Kamera-Undkinowerke, Dresden, Fed. Rep. of Germany

[21] Appl. No.: 809,899

[22] Filed: Jun. 24, 1977

[51] Int. Cl.² .................. G03B 17/20; G03B 19/12
[52] U.S. Cl. ...................................... 354/53; 354/155
[58] Field of Search ............... 354/152, 155, 200, 219, 354/53, 54, 57

[56] References Cited

U.S. PATENT DOCUMENTS 3,903,530   9/1975   Taguchi et al. .................. 354/155 X
4,016,576   4/1977   Nomura ........................... 354/152 X

FOREIGN PATENT DOCUMENTS 1950752   4/1970   Fed. Rep. of Germany ........... 354/155

Primary Examiner—Donald A. Griffin
Attorney, Agent, or Firm—William Anthony Drucker

[57] ABSTRACT

A viewfinder and exposure factor indicator system for photographic cameras comprising an indicator panel, a micro-luminous element for illuminating said panel, and a reproduction system arranged between the luminous element and the indicator panel. The image of said luminous element can be reproduced at the exit of said viewfinder system.

5 Claims, 4 Drawing Figures

PHOTOGRAPHIC CAMERA

BACKGROUND TO THE INVENTION

This invention relates to an indicator device in the viewfinder system of photographic cameras with indicator panel illuminated by a micro-luminous element.

For the indication of exposure and limit values in photographic cameras it is known to view micro-incandescent lamps, luminous diodes and other micro-luminous elements through the viewfinder eyepiece directly as indicators. In order to illuminate a symbol indicator with micro-luminous elements, for example in the case of micro-incandescent lamps the lamp globe is matted or ground; it is also known to arrange a diffusor plate between a lamp and a symbol indicator. With these measures the symbol indicator is illuminated irregularly and with loss of light.

The object of the invention consists in uniformly illuminating symbol indicators with micro-luminous elements in the viewfinder system of photographic cameras, and conducting them at maximum brightness to the viewing eye.

SUMMARY OF THE INVENTION

According to the invention, we provide a viewfinder and exposure factor indicator system for photographic cameras comprising an indicator panel, a micro-luminous element for illuminating said panel and a reproduction system arranged between the luminous element and the indicator panel or between the indicator panel and the prism, whereby an image of said luminous element can be reproduced at the exit of the viewfinder system. It is expedient that for the reflection of the effective surface of the luminous element into the viewfinder ray path the reproduction system is united with a deflector surface.

BRIEF DESCRIPTION OF DRAWINGS

The invention is illustrated and explained by reference to examples of embodiment shown in the accompanying drawings in which:

FIG. 3a shows an arrangement with reflection on the image-erecting surface of a pentahedral roof prism and FIG. 3b shows the lateral elevation of FIG. 3a.

DESCRIPTION OF PREFERRED EMBODIMENT

Figure 1:
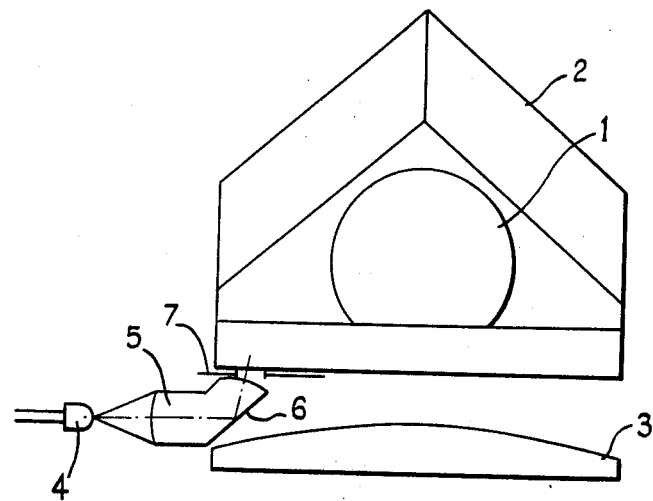
FIG. 1 shows a viewfinder system with symbol reflected in from beneath, seen from the eyepiece side.

In FIG. 1 there is represented the viewfinder system with the arrangement according to the invention, seen from the eyepiece side. A pentahedral roof prism 2 with field lens 3 lying therebeneath is arranged in known manner behind the eyepiece 1. Within the space between field lens 3 and pentahedral roof prism 2 there is provided an indicator system, consisting of luminous element 4, subsequently placed reproduction system 5 with deflector surface 6 and indicator panel 7 showing exposure factors such as time, aperture, values and distance.

Figure 2:
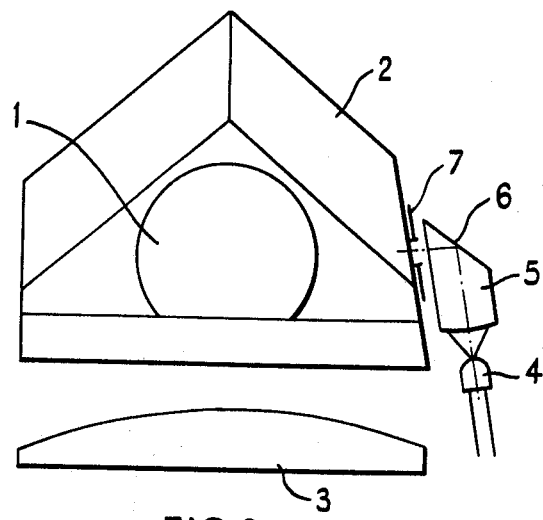
FIG. 2 shows a variant with reflection on the side face of a pentahedral roof prism.

FIG. 2 represents a variant of FIG. 1 in which the pentahedral roof prism 2 possesses a bevelled-off side face on which the indicator system is arranged.

Figure 3A:
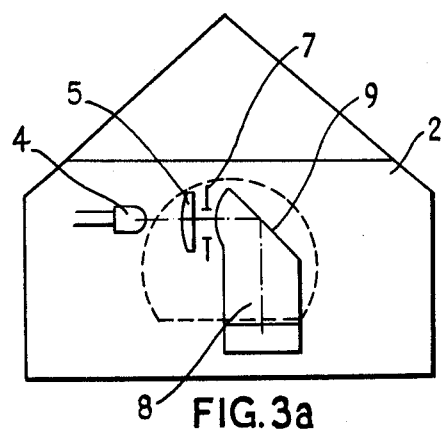
Figure 3B:
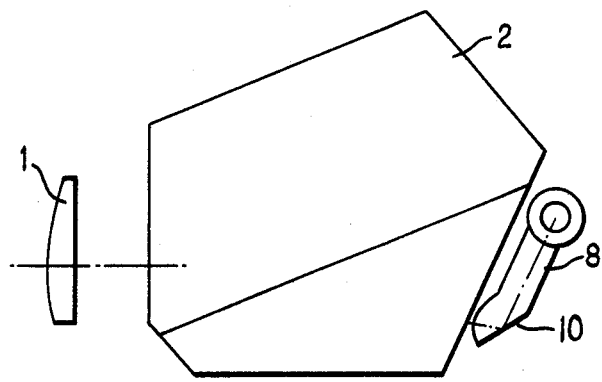

FIG. 3 shows another variant of the arrangement and formation of the indicator system. Here the indicator system is arranged opposite to the eyepiece 1, before the image-erecting surface of a pentahedral roof prism 2, and consists of a luminous element 4, a reproduction system 5, an indicator panel 7 and an optical component 8 varying the path length, with the deflector surfaces 9 and 10 (see FIGS. 3a and 3b). The optical component 8 which varies the path length is necessary whenever the indicator panel 7 to be reflected in is situated far inside or outside the focal length of the eyepiece 1. In these cases it is necessary, with the aid of an optical component with additional refractive power, to reproduce the indicator panel 7 in a plane which can be seen sharply simultaneously with the viewfinder image plane by the observer through the viewfinder eyepiece.

Due to the arrangement in accordance with the invention of the reproduction system 5, in combination with the path-varying optical component 8 and/or the eyepiece 1, the illuminating surface of the luminous element 4 is reproduced in the exit pupil of the viewfinder system and thus in the pupil of the eye of the observer.

The indicator panel 7 is arranged in the vicinity of the reproduction system 5. Thus the possibility is gained of arranging the indicator panel 7 in the plane of sharpness of the viewfinder eyepiece 1 in larger dimensions than is the case with direct viewing of the effective surface of the luminous element 4.

Furthermore due to the reproduction of the effective surface of the luminous element 4 in the exit pupil of the viewfinder system a uniform illumination of the indicator panel is achieved with optimum brightness. One or more luminous elements and thus indicator systems are arranged for the indication of exposure. As indicator panel there can be used any desired symbols, such as arrow, triangle, etc. Moreover it is also within the scope of the invention to arrange numerical indications in the indicator panel.

We claim:

1. In a camera having a viewfinder and exposure factor indicator system and including a roof prism, a field lens, an eyepiece, an indicator panel carrying exposure factor markings, and a luminous element which illuminates the indicator panel uniformly, the provision of an image reproduction system adjacent the indicator panel, the indicator panel being located between said system and the roof prism, which system transmits therethrough the light ray from the luminous element to the roof prism so as to reproduce the exposure factor markings and an image of the luminous element visible to the observer of the viewfinder, said reproduction system having a reflecting surface arranged to reflect the light from the luminous element into the roof prism.

2. A camera according to claim 1 wherein said system is disposed between the luminous element and said indicator panel.

3. A camera according to claim 1 in which the prism is formed with a bevelled off side face wherein said system is disposed against said bevelled-off side face.

4. In a camera having a viewfinder and an exposure factor indicator system and including a roof prism, a field lens, an eyepiece, an indicator panel carrying exposure factor markings, and a luminous element which illuminates the indicator panel uniformly, the provision of an image reproduction system adjacent the prism, the reproduction system being located between said indicator panel and said roof prism, which system transmits therethrough the light ray from the luminous element to the roof prism so as to reproduce the exposure factor markings and an image of the luminous element visible to the observer of the viewfinder, said reproduction system having a reflecting surface arranged to reflect the light from the luminous element into the roof prism.

5. A camera according to claim 4, wherein the image reproduction system is positioned against a surface of the roof prism which surface is on the opposite side of the roof prism to the eyepiece.

* * * * *